United States Patent [19]
Fissler

[11] Patent Number: 5,487,329
[45] Date of Patent: Jan. 30, 1996

[54] COOKING OR BOILING POT

[75] Inventor: Harald Fissler, Idar-Oberstein, Germany

[73] Assignee: Vesta AG & Co. OHG, Idar-Oberstein, Germany

[21] Appl. No.: 422,498

[22] Filed: Apr. 12, 1995

[30] Foreign Application Priority Data

Apr. 15, 1994 [DE] Germany ............... 44 12 944.0

[51] Int. Cl.⁶ .................... A47J 27/00; B32B 15/00
[52] U.S. Cl. .................... 99/403; 99/422; 99/447; 99/DIG. 14; 126/373; 126/375; 126/390; 220/453; 220/626; 220/912; 428/653; 428/683
[58] Field of Search ............... 99/330, 403, 401, 99/422, 447, DIG. 14; 126/373, 375–379, 369, 390; 220/453, 626, 912; 219/544, 548, 438, 553, 521; 428/653, 683

[56] References Cited

U.S. PATENT DOCUMENTS

| | | | |
|---|---|---|---|
| 3,615,365 | 10/1971 | McCunn | 420/58 |
| 3,632,980 | 1/1972 | Hornaday, Jr. | 219/462 |
| 3,767,896 | 10/1973 | Ryan | 219/438 |
| 4,090,011 | 5/1978 | Barkman et al. | 428/653 |
| 4,526,842 | 7/1985 | Eide | 428/683 |
| 4,544,818 | 10/1985 | Minamida | 126/390 |
| 4,596,236 | 6/1986 | Eide | 126/375 |
| 4,622,948 | 11/1986 | Oh | 99/422 |
| 4,705,727 | 11/1987 | Hunter | 428/653 |
| 5,064,055 | 11/1991 | Bessenbach et al. | 220/912 |
| 5,351,608 | 10/1994 | Muchin et al. | 99/447 |
| 5,357,850 | 10/1994 | Coudurier | 99/422 |

FOREIGN PATENT DOCUMENTS

| | | |
|---|---|---|
| 8630655.3 | 2/1987 | Germany. |
| 4125115 | 2/1993 | Germany. |

*Primary Examiner*—Timothy F. Simone
*Attorney, Agent, or Firm*—Herbert Dubno

[57] ABSTRACT

A cooking pot or boiling pot whose austenitic sheet metal base has an aluminum or copper alloy plate bonded thereto and a cover member bonded to the plate and formed with recesses in which insets are received. The cover member can be composed of austenitic sheet steel and the insets of ferromagnetic sheet steel or the insets can be composed of austenitic sheet steel and the cover member of ferromagnetic sheet steel for use of the pot for conductive bottom heating or for electromagnetic inductive heating.

15 Claims, 4 Drawing Sheets

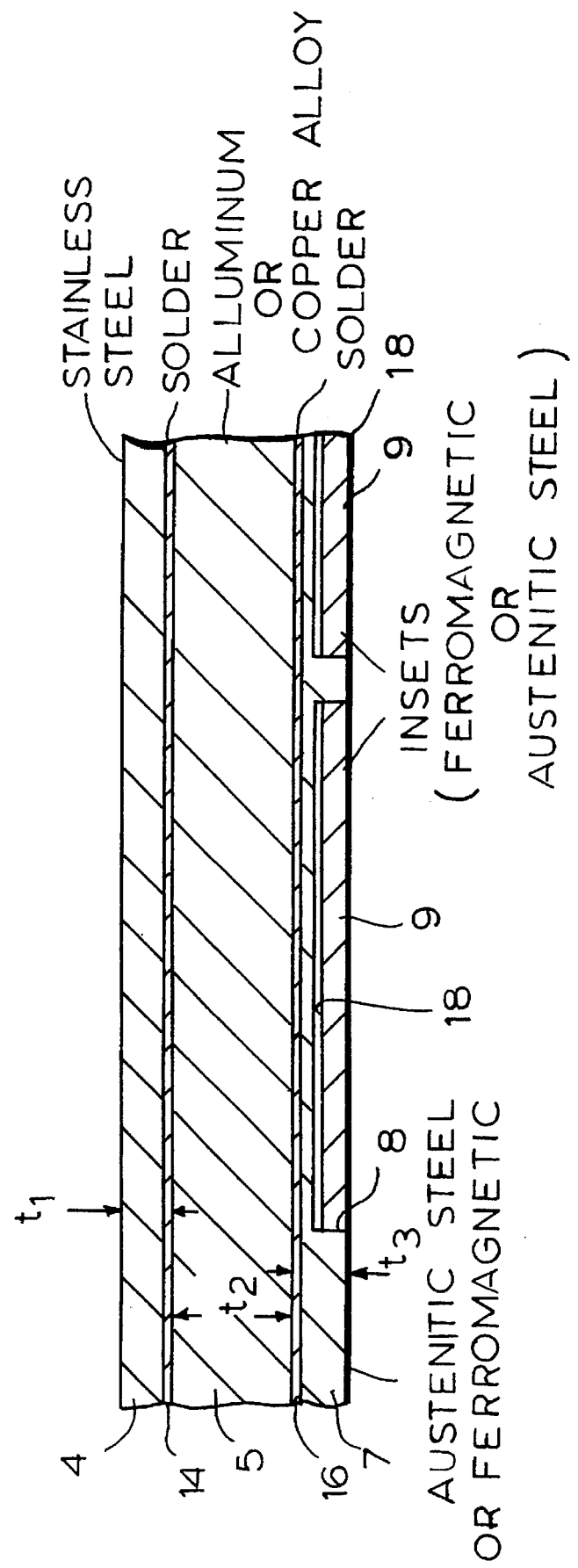

COOKING OR BOILING POT

FIELD OF THE INVENTION

My present invention relates to a utensil, especially a cooking and/or boiling pot for bottom heating by thermal conduction or electromagnetic induction.

1. Background of the Invention

A cooking pot or like utensil can comprise a horizontally round container for the cooking and/or boiling media including a container casing and a container base made of austenitic steel, a plate disposed against the container base made of a high thermoconductivity metallic material (i.e. an aluminum or copper alloy) and a metallic covering for the plate. Cooking and/or boiling appliances of the above type, if provided for conductive heat transfer and inductive heating, and also referred to as all-oven cooking or boiling appliances and are especially designed for household use.

Cooking and/or boiling utensils designed for bottom thermal energy application through thermal conduction contain a plate made of an aluminum or a copper alloy and a steel sheet plate covering made of a suitable austenitic steel alloy. Austenitic steel was chosen for its noncorrosion characteristics. Austenitic steel is, however, not ferromagnetic. This leads to disadvantages for thermal energy application through electromagnetic induction as the plate covering receives only ohmic heating. In comparison a ferromagnetic material absorbs considerably more thermal energy through electromagnetic induction as the hysteresis loss is transformed into thermal energy. The transferred electromagnetic power which is transformed into thermal energy can be improved for such cooking and/or boiling utensils.

To improve the application of thermal energy through electromagnetic induction in the described cooking and/or boiling utensils of the above design, ferromagnetic plates have been used (DE 86 30 655 U). The ferromagnetic plates are provided with an austenitic plate covering or have an exposed base. In the latter form corrosion could occur, although corrosion-resistant ferromagnetic material is normally used. A plate having an austenitic plate covering interferes with the transfer of power of the electromagnetic induction.

Cooking and/or boiling appliances of the above design are known to include perforations in the covering base for the ferromagnetic plate covering, into which the plate material is fitted.

2. Objects of the Invention

It is the principal object of the invention to provide a cooking utensil having a high power absorbency for thermal energy supplied by electromagnetic induction but being also well suited for the supply of thermal energy through thermal conduction, i.e. by placing it onto a cooker.

Another object of this invention is to provide an improved cooking pot for all purpose use which is free from the drawbacks of earlier systems.

SUMMARY OF THE INVENTION

These objects are attained in the bottom-heated cooking utensil for bottom thermal energy application through thermal conduction or electromagnetic induction, having a horizontally round container including a container casing and a container base, made of austenitic steel, a plate disposed against the container base made of a high thermoconductivity metallic material (i.e. an aluminum or copper alloy) and a metallic covering for the plate.

According to the invention the plate covering has a circular discoid covering base with several covering base recesses positioned over the entire surface, covering base filling pieces are fitted into the covering base recesses, the covering base being made of austenitic sheet steel and the covering base filling pieces being made of ferromagnetic sheet steel, and the covering base and the covering base filling pieces are metallically connected to the plate and the plate in turn to the container base.

Alternatively:

the plate covering has a circular discoid covering base with several covering base recesses positioned over the entire surface, the covering base filling pieces are fitted into the covering base recesses, the covering base being made of ferromagnetic sheet steel and the covering base filling pieces of austenitic sheet steel, and the covering base and the covering base filling pieces are metallically connected (bonded) to the plate and the plate, in turn, is bonded to the container base.

It is obvious that for both alternatives, corrosion-resistant ferromagnetic steel alloys are used if possible.

The invention is based on the fact that the ferromagnetic areas in the covering base of the plate covering are heated with an extreme high power absorption. Although the ferromagnetic areas represent islands or networks, the geometrical proportion in relation to the covering base on one hand and the covering filling pieces on the other can be adjusted in such a way, that an extremely high homogenous heating of the plate and consequently of the container base and the boiling or cooking media is achieved. Surprisingly no disturbing corrosion appears in the contact areas between austenitic and ferromagnetic materials especially in the gaps or seams between the covering base recesses and the covering base filling pieces, which naturally are extremely closely fitted.

The covering base recesses and the fitted covering base filling pieces modify the thermal extension behavior of the plate covering and the covering base. A special advantage of the invention is that the modification can be adjusted without reducing the power absorption for thermal conduction by electromagnetic induction and in such a way, that during thermal conduction no disturbing deformation (e.g. outward bulging) of the plate covering. The respective adjustment can be calculated or determined by experiment for the different cooking and/or boiling appliances.

If the induction field is adjusted in a way that a rotationally symmetrical electromagnetic field is created around a central axis and is radiated via the induction plate and if the cooking and/or boiling appliance is positioned onto an induction plate in a way that its vertical geometrical axis coincides more or less exactly with the symmetrical axis of the electromagnetic field, the cooking utensil is especially advantageous.

An electromagnetic field which is symmetrical in this way can easily be generated by an induction coil containing a helical or flat coil. Under these symmetrical conditions, the invention provides that the covering base recesses and the covering base filling pieces be shaped symmetrically.

For example the covering base recesses can be circular arc segments with a width of 10–20 mm, positioned between two radially arranged covering base webs, with the also circular arc-sectioned covering base filling pieces fitted into the circular arc segments. It is preferred to design this in such a way that the four covering base webs are arranged at right angles to one another, starting at the circular shaped covering base center. It is, however, also possible to provide the covering base recesses as circle segments which are separated by radially arranged covering base webs and also for circle-segment shaped covering base filling pieces to be fitted into the circle segments. In this case a design is recommended, limiting the circle segments at the plate covering edge to a semicircular shape. For this the circle segments are best of equal size.

As part of the invention the plate covering can consist of a sheet metal disk, can, however, also be a capsular covering (see DE 41 25 115.6 C2).

The described embodiments are specially advantageous if, with regards to the differing components thickness, a special relationship is observed. According to this, the container with the container base has a metal thickness of 0.7 to 1.0 mm, the plate covering a metal thickness of 0.7 mm or less and the plate in the aluminum alloy version a thickness of 5–9 mm.

Cooking and/or boiling utensils on which the invention is based contain mostly and preferably a covering base cold bottom geometry which is slightly concave compared to a level support surface for the cooking and/or boiling appliance, i.e. a cooker. This ensures that in its cold condition only the edge of the cooking and/or boiling appliance covering base rests on an assigned level support plate i.e. a cooker. If the covering base has a cold base geometry which is slightly concave compared to a level support surface for a cooking and/or boiling appliance, the invention teaches that-the sheet metal thickness of the container base, the sheet metal thickness of the covering base, the thickness of the plate, the shape of the covering base recesses and the covering base filling pieces are deformation-proof. Deformation-proof means that a slightly convex deformation of the covering base compared to the support surface does not occur during bottom thermal energy application or during thermal conduction of thermal energy.

An outward bulging deformation would cause the cooking and/or boiling utensil to only rest with its center on a level support surface i.e. on a cooker, causing the cooking and/or boiling appliance to wobble and would furthermore adversely affect the heat transfer through thermal conduction.

Within the context of the invention the plate can be connected to the container base and the plate covering in various ways. The plate covering can be especially intermetallicly connected to the covering base and for embodiments with capsular coverings to its capsular collar and the covering filling pieces to the plate and this in turn to the container base. There is, however, also the option for the plate covering to be soldered to its covering base and for embodiments with a capsular covering to its covering base and the capsular collar and the covering filling pieces to the plate and this in turn to the container base.

More particularly, the bottom-heated utensil of the invention can comprise:

a container having a container base with circular configuration composed of austenitic sheet steel and a container casing extending upwardly from the container base;

a thermal distribution plate coextensive with the container base and affixed to an external surface thereof continuously over all of the surface;

a metal plate cover member overlying the plate and bonded thereto, the cover member having a circular discoid cover base provided with a plurality of cover base recesses distributed over an entire surface of the cover base; and insets fitted into the recesses and bonded to the cover member, the insets collectively forming another member, one of the members being composed of austenitic sheet steel and the other of the members being composed of ferromagnetic sheet steel.

As previously noted, when the cover member is a member composed of austenitic sheet steel, the member formed by the insets is a member composed of ferromagnetic sheet steel, i.e. the insets are composed of ferromagnetic sheet steel. Conversely, when the cover member is composed of ferromagnetic sheet steel, the insets are composed of austenitic sheet steel.

BRIEF DESCRIPTION OF THE DRAWING

The above and other objects, features, and advantages will become more readily apparent from the following description, reference being made to the accompanying drawing in which:

FIG. 5 is a cross sectional detail of the bottom structure.

SPECIFIC DESCRIPTION

Figure 1:
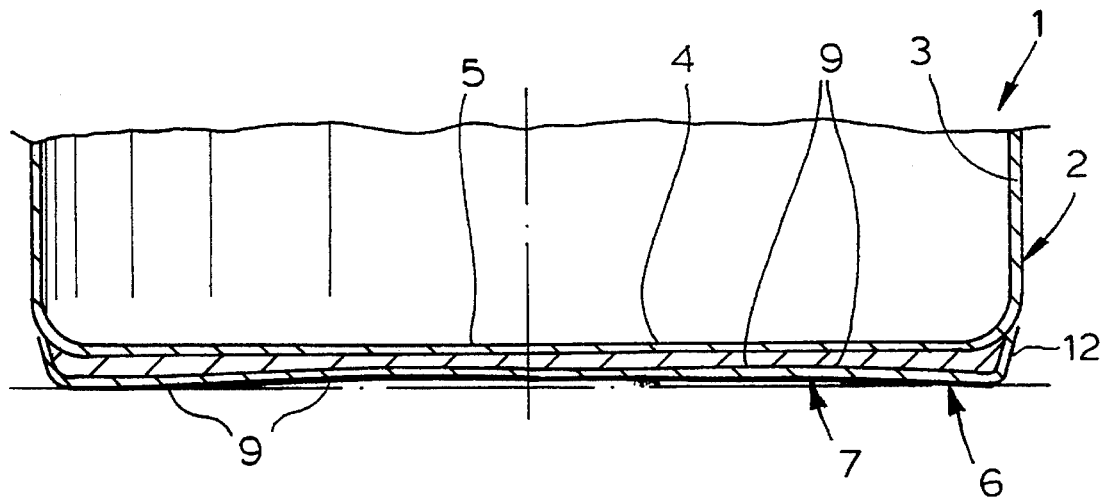
FIG. 1 is a vertical section through a cooking utensil according to the invention.

The cooking utensil is designed for bottom thermal energy application through thermal conduction or through electromagnetic induction. It comprises a horizontally round container 2 for the boiling and cooking media with a container casing 3 and the container base 4 made of austenitic sheet steel, a plate 5 connected to the container base made of a high thermoconductive metallic material, i.e. an aluminum or copper alloy and a metallic plate covering 6. The latter can have a collar 12 flush with the wall of the vessel to encapsulate the plate 5.

The plate covering 6 has a discoid covering base 7 with several covering base recesses 8 over the entire surface and/or the radius. Covering base filling pieces 9 are fitting into the covering base recesses 8. The arrangement may be designed for the covering base 7 to be made of austenitic sheet steel and the covering base filling pieces 9 of ferromagnetic sheet steel, the covering base 7 and the covering base filling pieces 9 being metallicly connected to the plate 5 and this in turn to the container base 4. The arrangement may, however, also be designed for the cover base 7 to be made of ferromagnetic steel and the covering base filling pieces of austenitic sheet steel. Here, too, the covering base 7 and the covering base filling pieces 9 are metallicly connected to plate 5 and these in turn to the container base 4.

Figure 2:
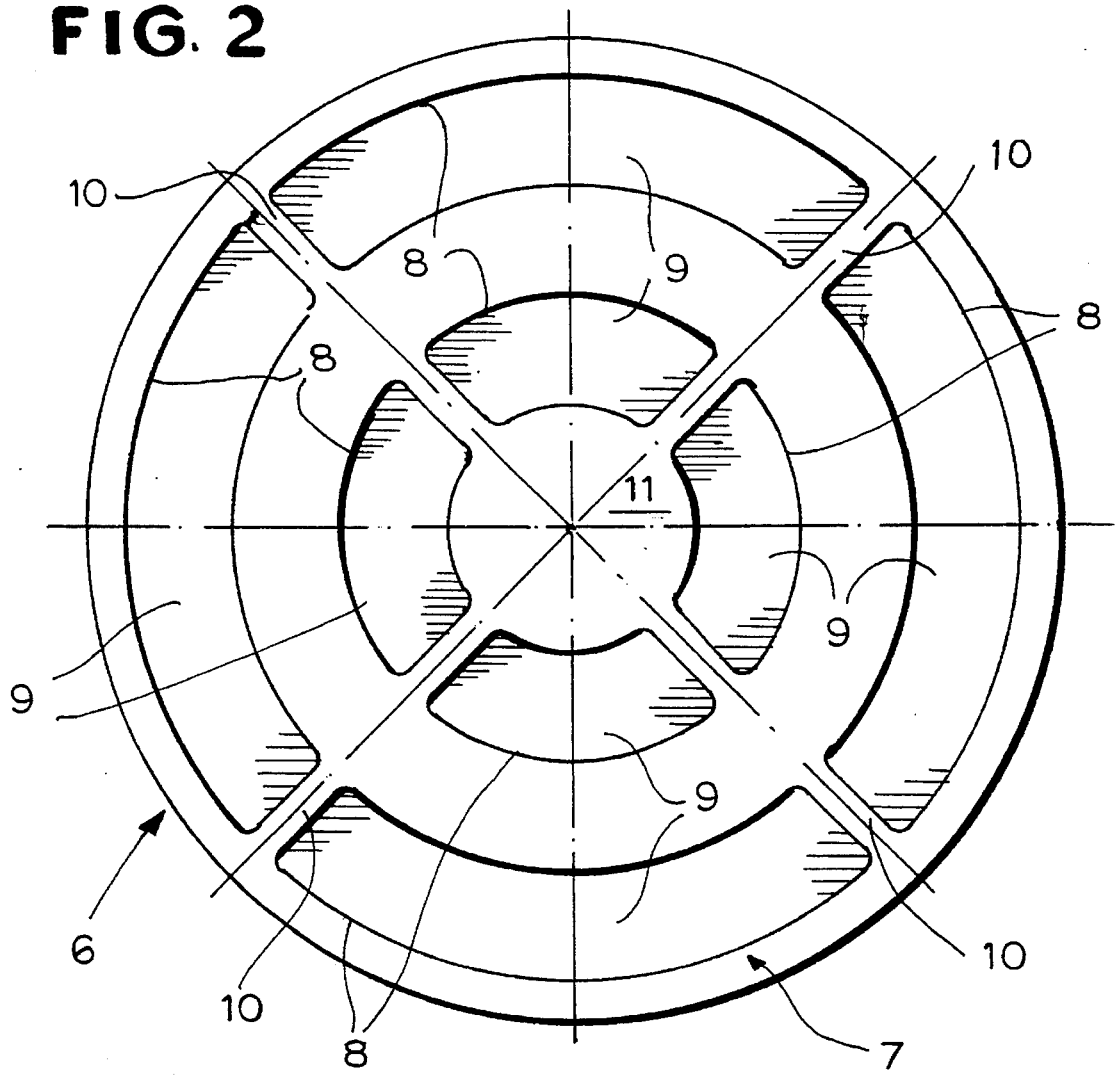
FIG. 2 is a bottom plan view of the covering base of the object of FIG. 1.

Within the context of the invention the covering base filling pieces 9 can basically have completely different forms, i.e. circular or triangular horizontal projections. It is recommended to shape the covering base filling pieces 9 so that they are circular and/or radially symmetrical. In this context the embodiments shown in FIGS. 1 and 2 are of special importance. It is apparent, that the covering base recesses 8 are designed as circular arc sections with a width of over 10 mm, the circular arc sections being arranged between radially positioned covering base webs 10 and the covering base filling pieces 9 fitted into a circular arc section 8. This embodiment shows four covering base webs 10 being arranged at right angles to one another and starting from a circular shaped covering base center 11. It is understood, that in the described embodiment, the covering base recesses 8 and the covering base filling pieces 9 can also be continuously circular.

Figure 3:
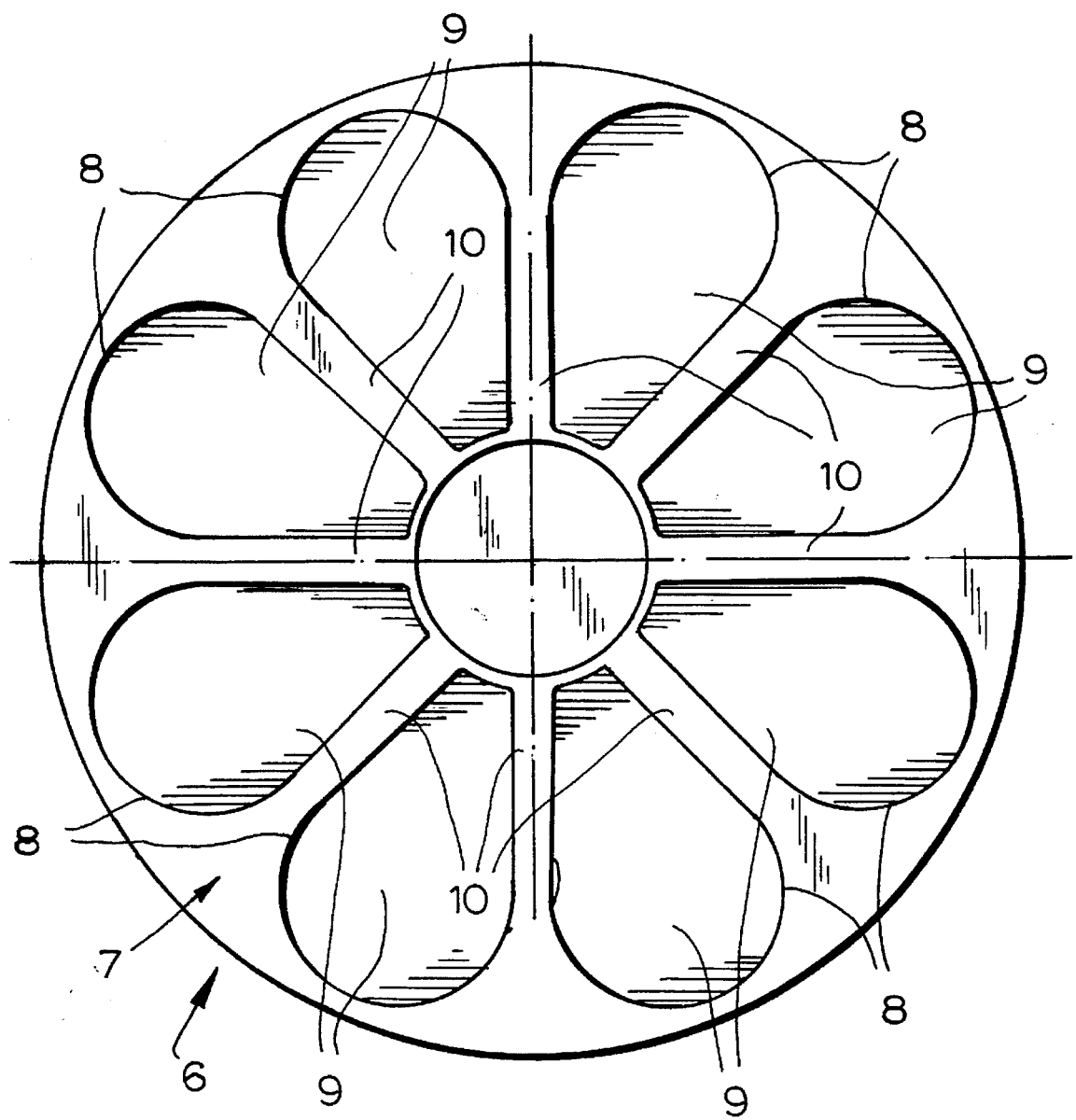
FIG. 3 is a view similar to FIG. 2 of another embodiment of a cooking utensil of the invention.
Figure 4:
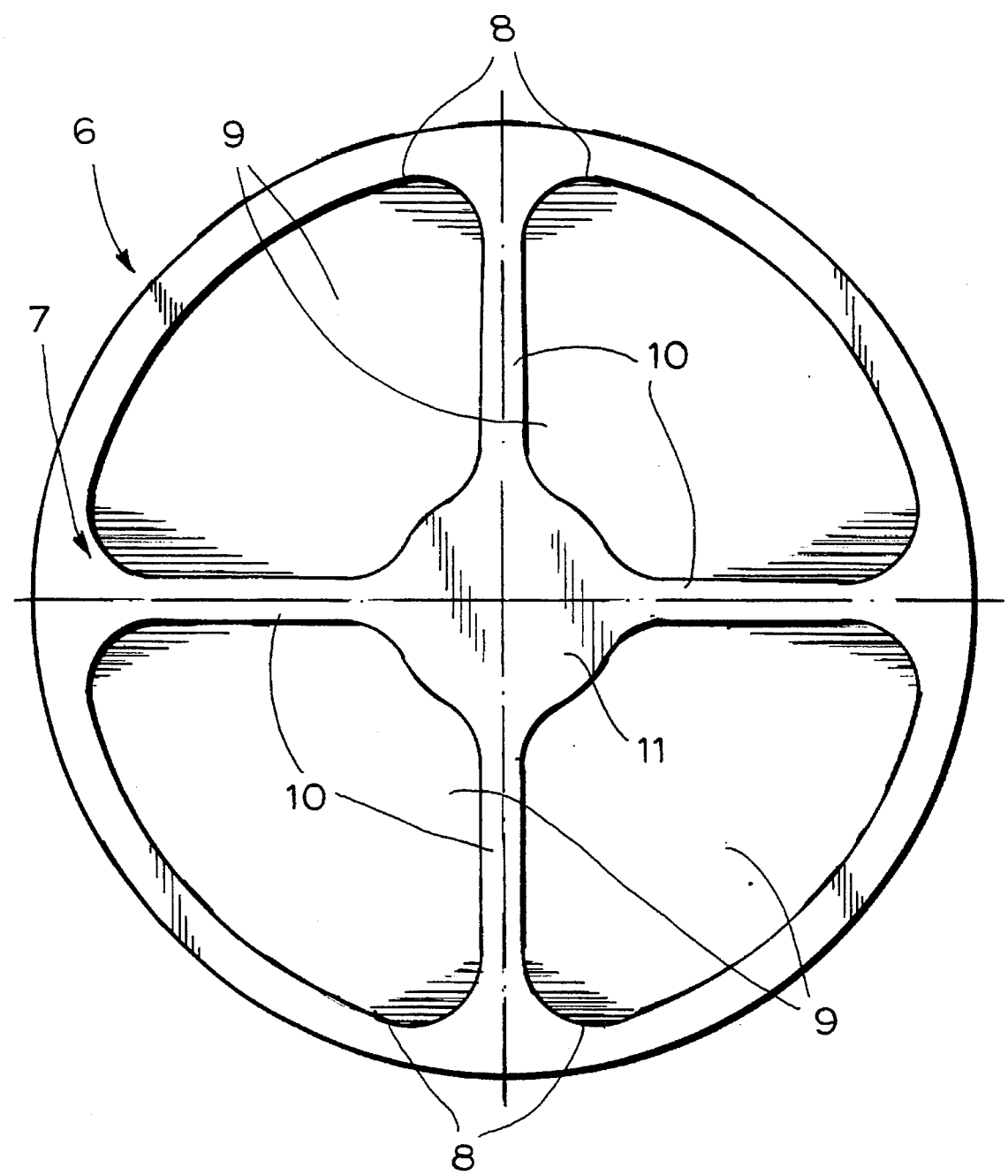
FIG. 4 is a view similar to FIG. 3 of a further embodiment of a cooking utensil of the invention.

In the embodiment shown in FIG. 3 the covering base recesses 8 are arranged as circular segments, between which the radially arranged covering base webs 10 are positioned. The also circular segment shaped covering base filling pieces 9 are fitted into the circular segments 8. At the same time the circular segments are limited toward the edge of the plate covering 6 as semicircles. The circular segments 8 are of equal size.

It is understood that the plate covering 6, can, as already mentioned, be a capsular covering.

The connections of the container base 4, the plate 5 and the plate covering 6 can be intermetallic or a pressure weld. In this respect, the embodiment according to DE 41 25 115 C2is recommended. There is, however, also the option to connect the described components by soldering. The described deformation-stability can always be achieved.

As can be seen from FIG. 5, in particular, a solder layer 14 can be provided between the aluminum or copper alloy plate 5 and the austenitic steel base 4 of the cooking pot, another solder layer 16 can be provided between the cover member 7 which is composed of austenitic steel or ferromagnetic sheet steel and the plate 5 and the solder layers 18 can be provided between the insets 9 and the cover member 7 within recesses 6.

The insets 9 are composed of ferromagnetic sheet steel when the cover member 7 is composed of austenitic sheet steel and the insets 9 are composed of austenitic sheet steel when the cover member 7 is composed of ferromagnetic sheet steel.

The thickness $T_1$ of the container base may range between 0.7 and 1 mm while the thickness $T_2$ of the aluminum or copper alloy plate 5 is 5.9 mm and the thickness $T_3$ of the cover member 7 is 0.7 mm or less.

I claim:

1. A bottom-heated utensil comprising:
    a container having a container base of circular configuration composed of austenitic sheet steel and a container casing extending upwardly from said container base;
    a thermal distribution plate coextensive with said container base and affixed to an external surface thereof continuously over all of said surface;
    a metal plate cover member overlying said plate and bonded thereto, said cover member having a circular discoid cover base provided with a plurality of cover base recesses distributed over an entire surface of said cover base; and
    insets fitted into said recesses and bonded to said cover member, said insets collectively forming another member, one of said members being composed of austenitic sheet steel and the other of said members being composed of ferromagnetic sheet steel.

2. The bottom-heated utensil defined in claim 1 wherein said one of said members is said cover member and said other of said members are said insets.

3. The bottom-heated utensil defined in claim 1 wherein said one of said members are said insets and said other member is said cover member.

4. The bottom-heated utensil defined in claim 1 wherein said recesses and said insets are circularly symmetrical.

5. The bottom-heated utensil defined in claim 1 wherein said recesses and said insets are radially symmetrical.

6. The bottom-heated utensil defined in claim 1 wherein said recesses and said insets are circular arc segments of a width of 10 to 20 mm, said recesses being separated by radially-extending webs.

7. The bottom-heated utensil defined in claim 6 wherein four of said webs are disposed at right angles to one another and extend downwardly from a center of said cover base.

8. The bottom-heated utensil defined in claim 1 wherein said recesses and said insets are circular segments and said recesses are separated radially by circular webs.

9. The bottom-heated utensil defined in claim 8 wherein said segments are substantially semicircular.

10. The bottom-heated utensil defined in claim 1 wherein said recesses and said segments are circular segments of equal size.

11. The bottom-heated utensil defined in claim 1 wherein said cover member encapsulates said plate.

12. The bottom-heated utensil defined in claim 1 wherein said container base has a thickness of substantially 0.7 to 1 mm, said plate has a thickness of 5 to 9 mm and said cover member has a thickness of at most 0.7 mm.

13. The bottom-heated utensil defined in claim 1 wherein said cover base has a cold geometry which is slightly concave outwardly relative to a level support surface and the thicknesses of said container base, said cover base and said plate and the shapes of said recesses and said insets render said cover base substantially free from outward bulging upon heating.

14. The bottom-heated utensil defined in claim 1 wherein said cover member is intermetallicly connected to said plate, said plate is intermetallicly connected to said container base, and said insets are intermetallicly connected to said cover member.

15. The bottom-heated utensil defined in claim 1 wherein said plate is soldered to said container base, said cover member is soldered to said plate and said insets are soldered to said cover member.

\* \* \* \* \*